United States Patent
Hanes et al.

(10) Patent No.: US 12,461,958 B2
(45) Date of Patent: Nov. 4, 2025

(54) CONTEXT INJECTION FOR IMPROVED AI RESPONSE

(71) Applicant: Cisco Technology, Inc., San Jose, CA (US)

(72) Inventors: M. David Hanes, Lewisville, NC (US); Vivek Kumar Singh, Cary, NC (US); Gonzalo A. Salgueiro, Raleigh, NC (US); Derek William Engi, Ferndale, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/458,739

(22) Filed: Aug. 30, 2023

(65) Prior Publication Data

US 2025/0036674 A1 Jan. 30, 2025

Related U.S. Application Data

(60) Provisional application No. 63/515,193, filed on Jul. 24, 2023.

(51) Int. Cl.
*G06F 16/335* (2019.01)
*G06F 16/332* (2025.01)

(52) U.S. Cl.
CPC ........ *G06F 16/335* (2019.01); *G06F 16/3325* (2019.01)

(58) Field of Classification Search
CPC . G06F 16/335; G06F 16/3325; G06F 16/3326
See application file for complete search history.

(56) References Cited

U.S. PATENT DOCUMENTS 8,615,512 B2 * 12/2013 Wexler ................ G06F 16/9535
707/738
9,805,142 B2 * 10/2017 Sanghai ............ G06F 16/90328
(Continued)

FOREIGN PATENT DOCUMENTS

EP 3185139 A1 * 6/2017 ............. G06F 17/30

OTHER PUBLICATIONS

Wikipedia, "Flesch-Kincaid readability tests," retrieved from https://en.wikipedia.org/wiki/Flesch%E2%80%93Kincaid_readability_tests, on Aug. 22, 2023, 6 pages.

*Primary Examiner* — James E Richardson
(74) *Attorney, Agent, or Firm* — Edell, Shapiro & Finnan, LLC

(57) ABSTRACT

A method comprises: receiving a query on a topic from a user associated with user attributes indicative of a user comprehension level on the topic; providing the query to an AI model; receiving from the AI model a response to the query that has a response comprehension level on the topic that is less than the user comprehension level; iteratively adding, to the query, topically-relevant user attributes of the user attributes to produce iterative queries that increase in technical detail on the topic; providing the iterative queries to the AI model; responsive to providing the iterative queries, receiving, from the AI model, iterative responses that increase in technical detail on the topic and have response comprehension levels that increase on the topic; and determining, among the iterative responses, a final response having a response comprehension level that most nearly matches the user comprehension level.

20 Claims, 8 Drawing Sheets

(56) References Cited

U.S. PATENT DOCUMENTS

| | | | |
|---|---|---|---|
| 10,943,185 B1* | 3/2021 | Witting | G06F 9/451 |
| 2003/0093275 A1* | 5/2003 | Polanyi | G09B 17/003 |
| | | | 704/E15.045 |
| 2012/0095976 A1* | 4/2012 | Hebenthal | G06F 16/9536 |
| | | | 707/706 |
| 2013/0060763 A1* | 3/2013 | Chica | G06F 16/9535 |
| | | | 707/E17.084 |
| 2016/0203215 A1 | 7/2016 | Allen et al. | |
| 2016/0358240 A1* | 12/2016 | Redfern | G06Q 30/0619 |
| 2017/0193092 A1* | 7/2017 | Byron | G06F 40/40 |
| 2017/0322939 A1* | 11/2017 | Byron | G06N 20/00 |
| 2017/0372215 A1* | 12/2017 | Platt | G06F 16/245 |
| 2019/0147760 A1* | 5/2019 | Bruckner | G06N 20/00 |
| | | | 706/11 |
| 2019/0347563 A1* | 11/2019 | Bruno | G06N 5/022 |
| 2020/0034427 A1 | 1/2020 | Ferrucci et al. | |
| 2020/0104959 A1* | 4/2020 | Ensign | G06N 20/20 |
| 2020/0126676 A1 | 4/2020 | Willner | |
| 2020/0159795 A1* | 5/2020 | Weldemariam | G06F 16/9535 |
| 2022/0050836 A1 | 2/2022 | Lane et al. | |
| 2022/0050965 A1* | 2/2022 | Watanabe | G06F 40/30 |
| 2022/0215018 A1* | 7/2022 | Thatcher | G06F 16/93 |
| 2022/0414348 A1* | 12/2022 | Muralitharan | G06F 16/3329 |
| 2023/0267342 A1* | 8/2023 | Bansal | G06F 16/3338 |
| | | | 706/46 |
| 2023/0410677 A1* | 12/2023 | Ratcliffe, Jr. | G09B 17/003 |
| 2024/0095491 A1* | 3/2024 | Birru | H04L 51/02 |
| 2025/0005050 A1* | 1/2025 | Krishnan | G06F 16/338 |
| 2025/0005064 A1* | 1/2025 | Bailey | G06F 40/30 |

* cited by examiner

502 — I am Webex user and have login issue. I got SSO configuration with ADFS, not sure how to fix this 504 — As a Webex user, if you're experiencing login issues with your Single Sign-On (SSO) configuration using Active Directory Federation Services (ADFS), here are some steps you can try:

Check your internet connection: Ensure that you are connected to the internet and that your connection is stable.

Verify login credentials: Check that the login credentials are correct. If you're not sure, reset the password or username by clicking on the "Forgot Password" or "Forgot Username" link on the login page.

Clear browser cache: Clear your browser's cache and cookies and then try logging in again.

Try a different browser: If the above steps do not work, try logging in using a different browser.

Contact your IT department: If you're still having issues logging in, reach out to your IT department for assistance. They can check the SSO configuration and ensure that it's set up correctly.

Contact Webex Support: If your IT department is unable to resolve the issue, contact Webex Support for further assistance. They can assist with troubleshooting the SSO configuration and resolving any problems.

I hope this helps!

FIG.5

CONTEXT INJECTION FOR IMPROVED AI RESPONSE

CROSS REFERENCE TO RELATED APPLICATION

This application claims priority to U.S. Provisional Application No. 63/515,193, filed Jul. 24, 2023, the entirety of which is incorporated herein by reference.

TECHNICAL FIELD

The present disclosure relates to improving artificial intelligence (AI) responses to a user query.

BACKGROUND

In the artificial intelligence (AI) natural language processing (NLP) space, prompt engineering is a fairly new area of research. One way to define it is that the description of a task that the AI NLP is supposed to accomplish is embedded in a language input, e.g., as a question, instead of being implicitly given. Prompt engineering typically works by converting one or more descriptions of the task to a prompt-based dataset and training a language model with what has been called "prompt-based learning" or just "prompt learning."

Providing the proper context for user queries to an AI model can greatly increase the relevance and clarity of an AI response from the AI model. Currently, this process is performed consciously by the user, which is time-consuming and tedious.

BRIEF DESCRIPTION OF THE DRAWINGS

FIG. 5 shows an initial query that indicates that a user is a Webex user experiencing a single sign-on (SSO) login problem, and an initial AI response to the initial query, according to an example embodiment.

DETAILED DESCRIPTION

Overview

In an embodiment, a method comprises: receiving a query on a topic from a user associated with user attributes indicative of a user comprehension level on the topic; providing the query to an artificial intelligence (AI) model; receiving from the AI model a response to the query that has a response comprehension level on the topic that is less than the user comprehension level; iteratively adding, to the query, topically-relevant user attributes of the user attributes to produce iterative queries that increase in technical detail on the topic; providing the iterative queries to the AI model; responsive to providing the iterative queries, receiving, from the AI model, iterative responses that increase in technical detail on the topic and have response comprehension levels that increase on the topic; and determining, among the iterative responses, a final response having a response comprehension level that most nearly matches the user comprehension level.

Example Embodiments

Figure 1:
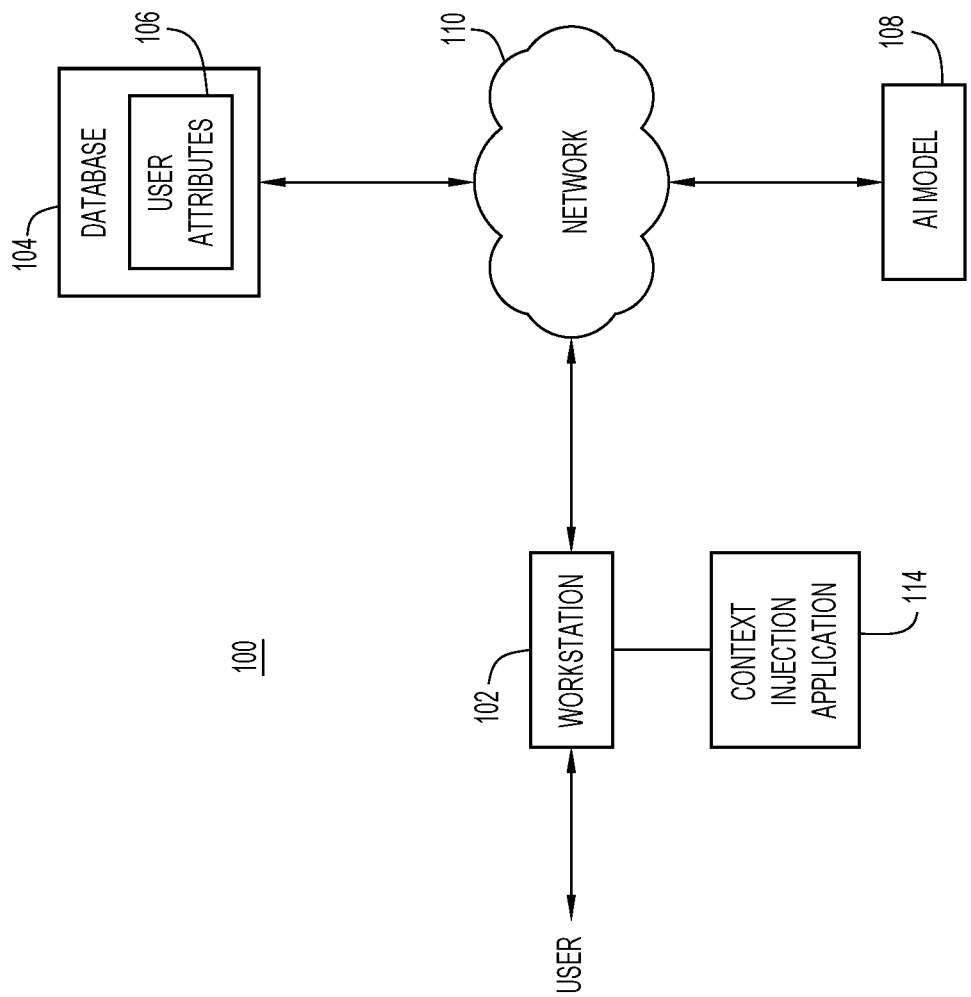
FIG. 1 is a network environment in which embodiments directed to context injection for an improved AI response may be implemented, according to an example embodiment.

FIG. 1 is an example network environment 100 in which embodiments directed to context injection for an improved artificial intelligence (AI) response may be implemented. The embodiments advantageously perform the context injection in an automated and real-time manner, which is transparent to a user. Network environment 100 includes a computer workstation 102 (also referred to as a "controller") operated by a user, a database 104 (or database application, user profile, and the like) that stores user attributes 106 associated with the user and that are indicative of a skill set and a knowledge level of the user on particular topics, and an AI model 108 (e.g., a generative AI model, such as an AI Chat Bot) connected to, and able to communicate with each other, over a network 110. Computer workstation 102 hosts a context injection application 114 that interacts with user attributes 106 and AI model 108 to implement embodiments presented herein.

At a high-level, starting with an initial query on a topic entered by the user, context injection application 114 iteratively adds topically/contextually-relevant user attributes 106 to the initial query, to generate iterative queries that are increasingly user-context aware (and query-topic aware), and provides the same to AI model 108. In response, AI model 108 iteratively generates increasingly more topically-relevant and technically-detailed AI responses. The foregoing iterations are transparent to the user. Context injection application 114 determines a final AI response among the AI responses that best or most closely matches the skill set and the knowledge level of the user, and presents the final AI response to the user.

Figure 2:
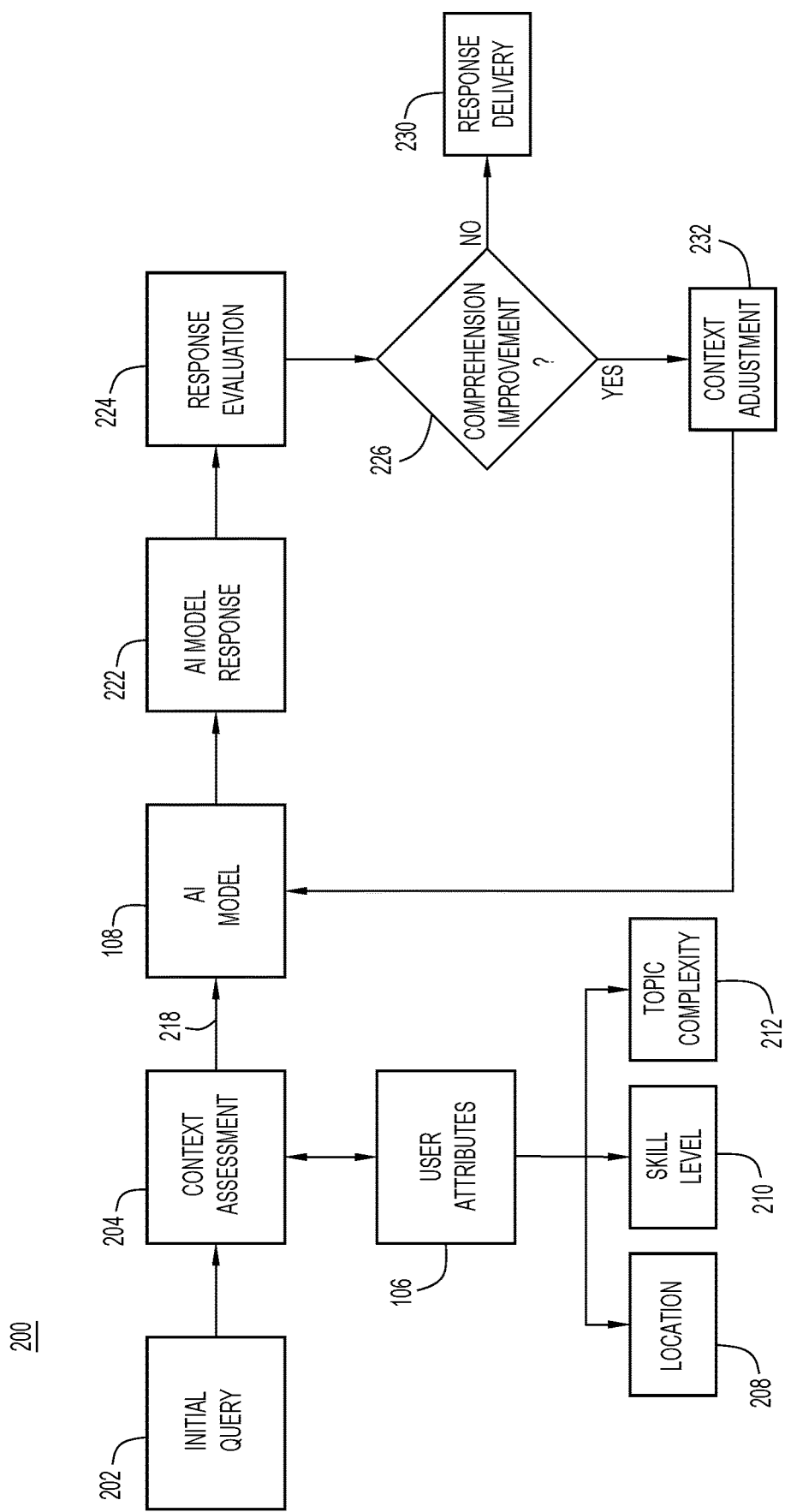
FIG. 2 is an illustration of a method in which additional user context is added to an initial query from a user in order to provide an AI response to the query that aligns with a skill set and a knowledge level of the user, according to an example embodiment.

FIG. 2 is an illustration of an example method 200 in which additional user context is added to an initial query from the user in order to provide an AI response to the query that aligns with a skill set and a knowledge level of the user. Attributes associated with the user (i.e., user attributes) or associated with the topic of interest expressed in the query can be systematically and iteratively injected into the initial query to generate/solicit iteratively better AI responses (i.e., answers to the queries), which are evaluated using existing comprehension scoring algorithms to eventually deliver a response that would be the "best" answer based on the attributes.

According to method 200, a user generates an initial query 202 and provides the same to context assessment 204. Context assessment 204 interfaces with user attributes 106 associated with the user. The user attributes 106 include a location 208 of the user, a skill level 210 of the user, and topic information 212 indicative of a topic complexity for topics with which the user is associated. Context assessment 204 injects into initial query 202 additional user-related context, including keywords, retrieved from user attributes 106, to produce a new query 218. New query 218 represents an expanded version of initial query 202. Context assessment 204 provides new query 218 to AI model 108. AI model 108 generates an AI response 222 or answer responsive to new query 218, and provides the AI response to response evaluation 224.

Response evaluation 224 determines a composite reading score or "comprehension level" of AI response 222. Response evaluation 224 compares AI response 222 to user attributes 106, to produce the comprehension level as a measure of similarly between the AI response and the user attributes (i.e., the skill set and knowledge level of the user). The higher the comprehension level, the higher the level of similarity. Response evaluation 224 provides the comprehension level to comprehension improvement test 226. Comprehension improvement test 226 determines whether the comprehension level improved relative to a previously computed comprehension level from a previous iteration of the process, and also determines whether the comprehension level can be improved further. When the comprehension level shows little or no improvement, and/or the comprehension level cannot be improved further, at 230, AI response 222 is delivered/presented to the user as a best and final response.

On the other hand, when the comprehension improved, or when the comprehension level can be improved/increased further, the above described process repeats using/treating new query 218 as an initial query. More specifically, flow proceeds to context adjustment 232 (which may form part of context assessment 204). Context adjustment 232 retrieves additional user attributes that are contextually relevant of/from user attributes 106, adds the additional user attributes to new query 218 to produce a further expanded query, provides the same to AI model 108, and the process repeats.

Figure 3:
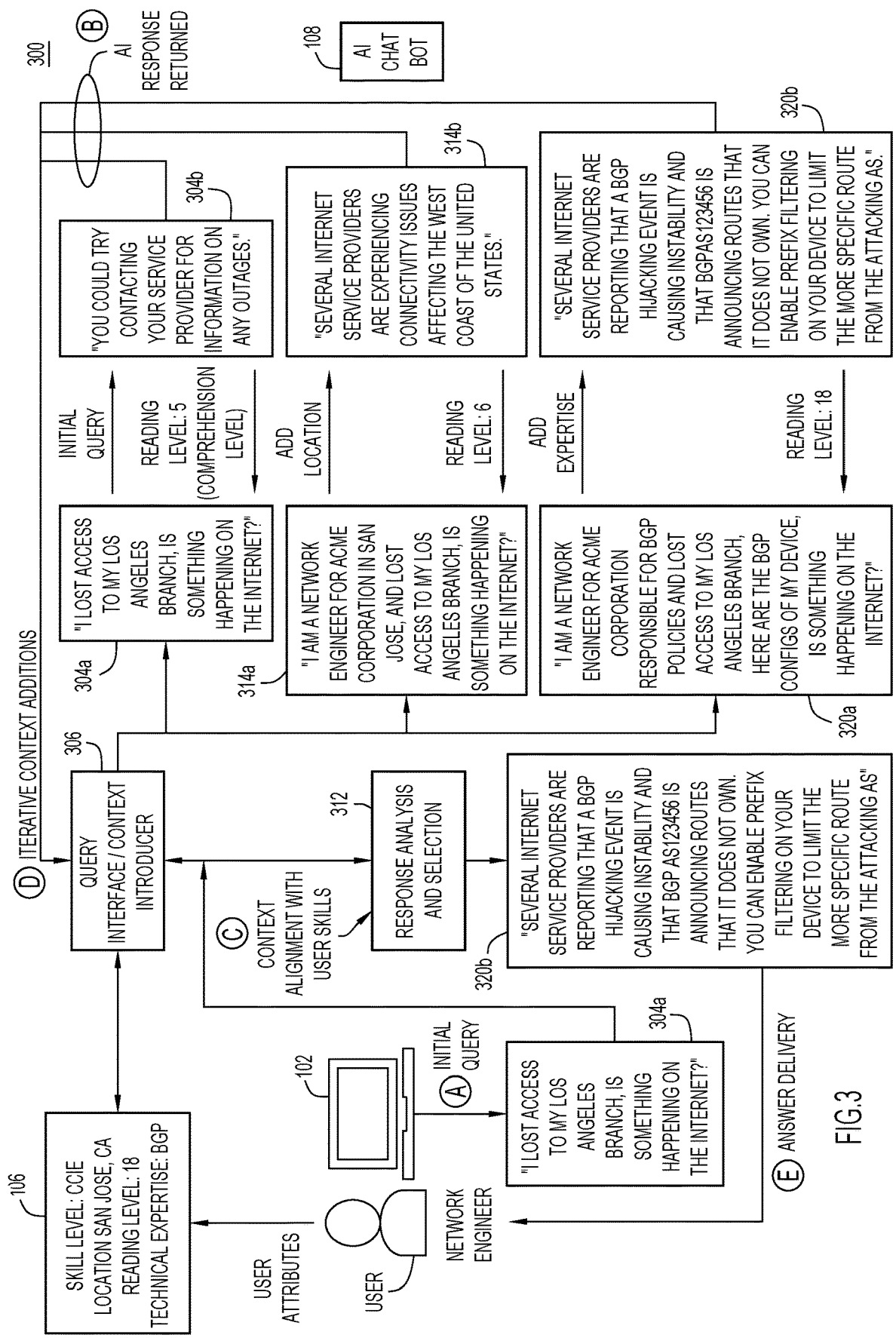
FIG. 3 is an illustration of a flow for prompt engineering and context injection that expands on the method of FIG. 2, according to an example embodiment.

FIG. 3 is an illustration of an example flow 300 of prompt engineering and context injection that expands on method 200 of FIG. 2. At a high level, a query interface collects a question from a user, generates additional queries and AI responses on behalf of the user, and eventually returns an AI response that is most in-line with the skill set and the knowledge level (including a reading level) of the user, as described below.

At A, the user constructs a first query 304*a* (i.e., an initial query) and posts the same to a query interface/context introducer 306. Query interface/context introducer 306 relays to AI model 108 first query 304*a*, without additional context. AI model 108 may be an AI Chat Bot that is designated for the workflow. In response, AI model 108 generates a first AI response 304*b* and, at B, returns the same to response analysis and selection 312 through query interface/context introducer 306. At C, response analysis and selection 312 determines whether to perform an iteration to expand first query 304*a*. To make this determination, response analysis and selection 312:

a. Determines/evaluates an AI response comprehension level of first AI response 304*b*, which represents a level of comprehension a user should have to understand the AI response. Any known or hereafter developed technique, including a machine learning (ML)/AI-based technique may be used to evaluate the response comprehension level on the topic. Evaluating the response comprehension level may be based on a reading comprehension level of the response and a quantity of specific details (e.g., technical terms) in the response; in which case the response comprehension level increases as the reading comprehension level and/or the quantity of technical terms increase. In this case, the AI response comprehension level of first AI response 304*b*=5.

b. Infers a user comprehension level of the user based on user attributes 106 that are relevant to the topic of interest (e.g., relevant to the topic/context of first query 304(*a*)). In this case, the user comprehension level=18. Any known or hereafter developed technique, including an ML/AI-based technique may be used to infer the user comprehension level on the topic based on the user attributes. In another example, the user comprehension level on the topic may be a predetermined level that is stored in the user attributes.

c. Determines a level of match or similarly between the comprehension levels from (a) and (b). Operations (a), (b), and (c) may be achieved using known comprehension scoring techniques. For example, the Flesch-Kincaid readability test can determine a reading ease or difficulty of a document. An ensemble of such methods can be compared against either user specified declarations (e.g., "I am a PhD in my field of expertise" or "I am a novice"), or learned through behavioral profiling of the individual—if an individual authors complicated documentation on a subject, the individual probably has a more advanced knowledge and understanding of the subject. To summarize, such topic-based comprehension assessment can be learned, as well as self-declared and then compared to response text using known comprehension capabilities.

d. Determines whether the AI response comprehension level has increased (i.e., improved) relative to a previous iteration or an initial level (e.g., initially set=0).

In this case, based on operations (a)-(d), response analysis and selection 312 learns that the AI response comprehension level has improved to 5 (from 0 initially) but is well below the user comprehension level=18, which means there is room for improvement in the AI response. Therefore, provided that topically-relevant user attributes have not been exhausted by previous iterations, flow proceeds to a next/subsequent iteration, described below. If the user attributes have been exhausted, the iterations end.

At D, in the next/subsequent iteration, query interface/context introducer 306 adds to first query 304*a* more contextually-relevant user attributes (e.g., additional user attributes relevant to the topic of first query 304*a*). For example, query interface/context introducer 306 adds to first query 304*a* user location and other attributes of user attributes 106, to produce a second query 314*a* that is more user-context aware than first query 304*a*, and sends the same to AI model 108. In response, AI model 108 generates a second AI response 314*b* and provides the same back to response analysis and selection 312. To determine whether to perform a next iteration, response analysis and selection 312 repeats operations (a)-(d) described above. Through operations (a)-(d), response analysis and selection 312 learns that second AI response 314*b* has an AI response comprehension level=6, which represents an improvement from the last iteration, but there is still room for improvement given that the user comprehension level=18. Therefore, flow proceeds to a next iteration.

In a next iteration, query interface/context introducer 306 adds to second query 314*a* more contextually-relevant user attributes and other information retrieved from user attributes 106, to produce a third query 320a that is more user-context aware than second query 314a, and sends the same to AI model 108. In response, AI model 108 generates a third AI response 320b and provides the same back to response analysis and selection 312. Response analysis and selection 312 determines whether to perform a next iteration. Repeating operations (a)-(d) above, response analysis and selection 312 learns that third AI response 320b has an AI response comprehension level=18, which represents an improvement from the last iteration, but that is now well matched to the user comprehension level=18. Therefore, there is no more room for improvement and another iteration to expand the query further is unnecessary. Response analysis and selection 312 selects third AI response 320b (which is the last and final AI response) as a final AI response that most closely matches the relevant user attributes.

Therefore, at E, flow 300 delivers/presents third AI response 320b to the user.

The above described process is summarized as follows. An initial query is asked by the user and posted against the query interface/context introducer 306. The query interface relays the question to an AI model (108), such as a designated AI Chat Bot, which generates an AI response. The AI response is analyzed to produce a reading comprehension level associated with the AI response. The query interface iteratively adds additional information about the user to further define the relationship that the user may have with a given topic. Natural Language models can be used to introduce additional keywords and context in the form of a new question. The multiple responses are returned from the designated Chat Bot to response analysis and selection (312), which analyzes the results of each response and gauges similarity of keywords associated with the skillset of the user as well as an inferred comprehension level for the given topic. The response that most closely aligns with the skill set and comprehension level of the user is returned as the accepted answer.

Advantageous features of the above-described method include: a query interface/context introducer 306 that processes initial questions of a user and formulates additional expanded questions based on the attributes of the user; response analysis and selection 312 configured to receive multiple responses from a Chat Bot and analyze keyword, attribute, and reading level comprehension for alignment with a Chat Bot user; collecting user attributes and topic maturity for the purpose of prompt engineering; gradually injecting user context to an AI model query with direct relation to topic comprehension; iteratively applying "what-if" scenarios of alternative questions based on collected attributes of a user and topic maturity; and continually evaluating topic comprehension compared to the knowledge level and skill set of a model querier; and identifying targeted answers from AI models based on comprehension evaluation.

Figure 4:
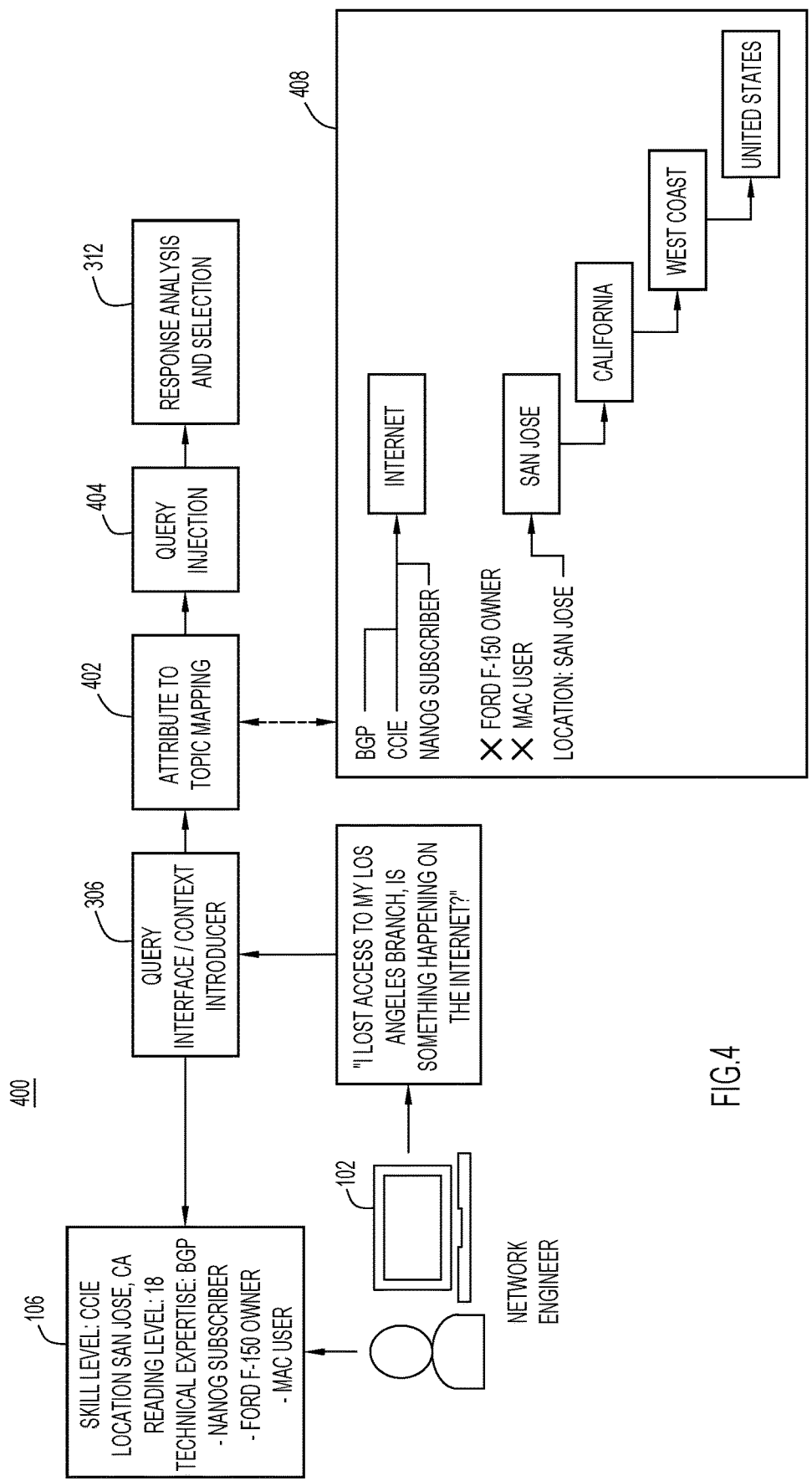
FIG. 4 is an illustration of context injection expanding on the flow of FIG. 3, according to an example embodiment.

FIG. 4 is an illustration of example context injection 400 expanding on iterative context injection D from FIG. 3. Query interface/context introducer 306 supplies a query (e.g., an initial query or a next iteration query) to attribute-to-topic mapping 402. Attribute-to-topic mapping 402 performs topic modeling (which may include ML/AI modeling) and attribute alignment between the topic and the query, to map the best-fitting user attributes to the topic of the query. For example, attribute-to-topic mapping 402 searches a user profile 408 (which may include user attributes 106) based on the query to find user attributes that contextually match a topic expressed in the query. User profile 408 may include information that conveys technical knowledge and skill sets of the user. User profile 408 may include a corporate directory that includes information about the user, a list of publications of the user, web postings by the user, club and society memberships of the user, and so on. Any known or hereafter developed attribute-to-topic mapping technique may be used, such as simple keyword matching or more sophisticated matching techniques. Role is one aspect that could help provide context, but other classifications extend beyond role.

Attribute-to-topic mapping evaluates the user comprehension level on topics and skills to identify additional user attributes and passes the same to query injection 404. Query injection 404 adds the additional user attributes to the query to produce an expanded query. Some roles and skills have little or no relevance to a prompt (query), while others are highly relevant. For example, when the query is directed to network technology, such as the Internet, and so on, attribute-to-topic mapping 402 may return from user profile 408 user attributes such as the border gateway protocol (BGP), Cisco expert level certification (CCIE), location San Jose, and so on, but not Ford F-150 Owner.

More generally, metadata can be collected on the user and generated from many sources and existing systems. For example, attributes such as skills and location may be specified by the user themselves in corporate directories. Additionally, the behavior and usage patterns of a user could be profiled to align with certain topics, for example, if the user regularly posts on a forum designed for a specific interest or responds to emails pertaining to a particular subject as a subject matter expert. Keywords can be extracted from each of these profiles, and used with techniques such as Named Entity Recognition to determine if frequently occurring keywords and topics can be integrated into a prompt and still obey rules of grammar.

Figure 6:
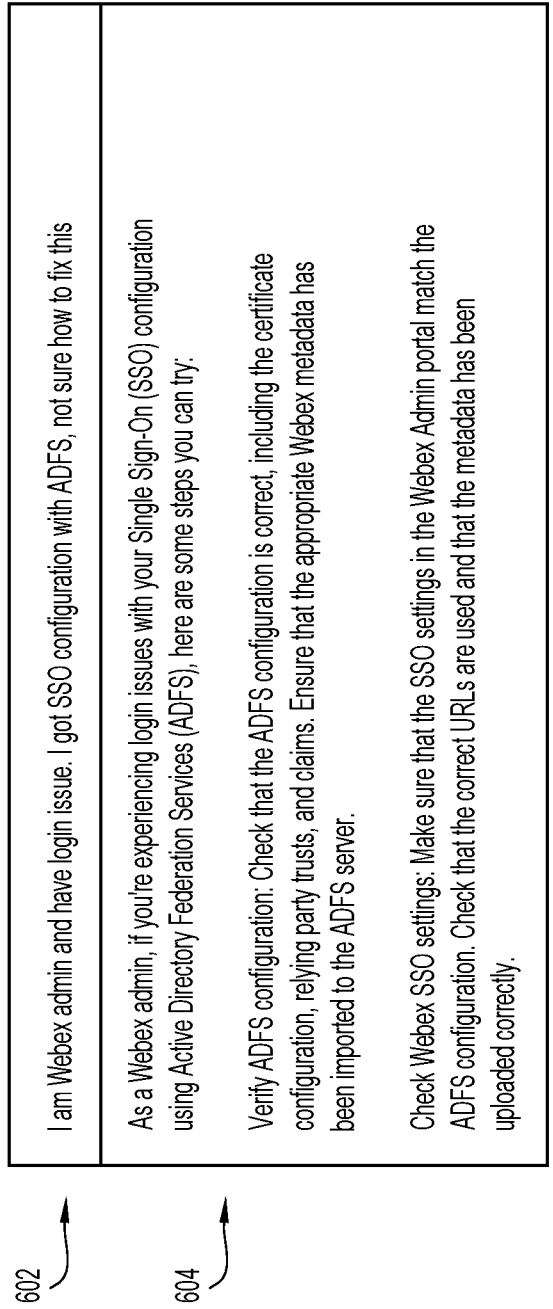
FIG. 6 shows a second query with additional user context to indicate that the user is a Webex administrator, and a second AI response to the second query, according to an example embodiment.

FIGS. 5 and 6 described below are comparative examples that show how simply making it known that a user is a Webex administrator or not can dramatically shift AI responses to a query. FIG. 5 shows an example initial query 502 that indicates that a user is a Webex user experiencing a single sign-on (SSO) login problem, and an initial AI response 504 to the initial query.

FIG. 6 shows an example second query 602 with additional user context to indicate that the user is a Webex administrator, and a second AI response 604 to the second query. The additional user context is injected into initial query 502 using techniques presented herein. The second AI response 604 is substantially more technically detailed and useful to the user.

In summary, when a user submits a query on a topic to an AI model to solicit an AI response to the query, a method iteratively adds topic-relevant attributes associated with the user (e.g., location of the user, technical expertise of the user, and so on) to the query to generate iterative queries of increasing complexity for the AI model, which in turn solicit, from the AI model, iterative AI responses of increasing complexity, until the AI model produces a final iterative AI response that has a level of difficulty to understand that most nearly matches a level of comprehension of the user (that is determined based on the user attributes).

An example method comprises:
  a. Receiving a query from a user who is associated with user attributes indicative of a knowledge and skill level, and thus user comprehension level, of the user on a technical topic expressed in the query, and providing the query to an AI model.

b. In response to the query, receiving from the AI model an AI response that has a response comprehension level related to the technical topic.

c. Iteratively adding technical topic-relevant user attributes to the query, to produce iterated queries of increasing technical complexity/technical detail (i.e., increasingly more specific), and providing the iterated queries to the AI model.

d. Receiving from the AI model iterated AI responses that are increasingly more technically complex (and increasingly more specific) and that have increasingly higher response comprehension levels related to the technical topic in correspondence with the iterated queries.

e. Determining, among the AI responses, a final AI response having a response comprehension level that most nearly matches the user comprehension level.

Figure 7:
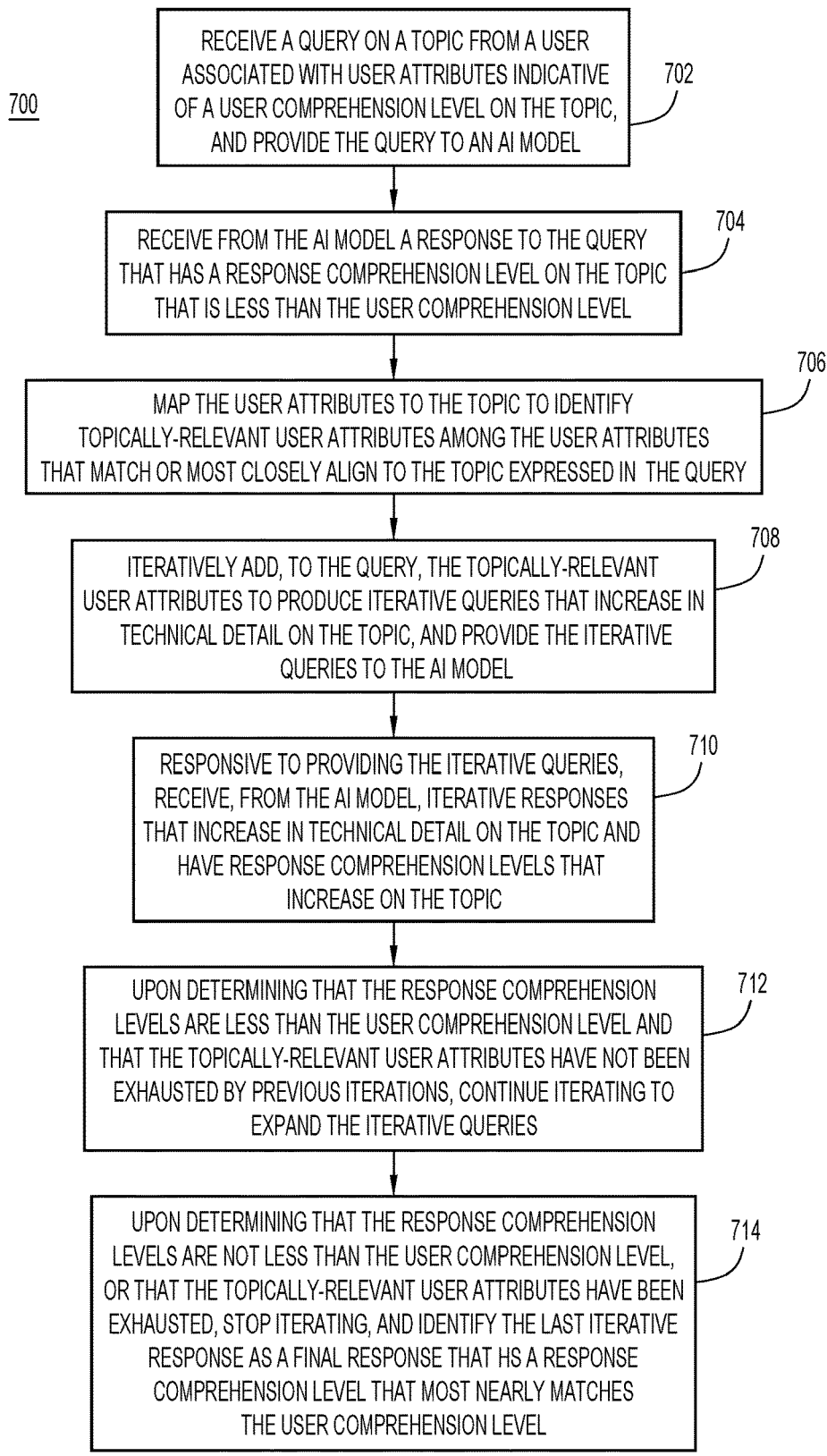
FIG. 7 is a flowchart of an iterative method of improving generative AI responses to queries on a topic, according to an example embodiment.

FIG. 7 is a flowchart of an example iterative method 700 of improving generative AI responses to queries on a topic (e.g., a technical topic such as network engineering). Operations of iterative method 700 are described above. Iterative method 700 may be performed by a workstation/controller operated by a user.

At 702, the controller receives a query on the topic from the user. The user is associated with user attributes stored in a database and that are indicative of a user comprehension level on the topic, including a skill set and a knowledge level of the user on the topic. The controller may evaluate the user comprehension level based on the user attributes, or the user comprehension level may be predetermined. The controller provides the query to an AI model, such as a generative AI model trained to generate responses to queries on the topic.

At 704, the controller receives from the AI model a response to the query that has a response comprehension level on the topic that is less than the user comprehension level.

The controller performs next operations 706-712 iteratively/repeatedly, one query-response at a time. Operations 706-712 represent an iterative process.

At 706, the controller iteratively maps the user attributes to the topic to identify topically-relevant user attributes (i.e., particular user attributes) among the user attributes that match or most closely align to the topic expressed in the query. The controller performs such mapping prior to/for each iterative adding operation, described below. The mapping may include searching the user attributes in a user profile of the user that includes information that conveys technical knowledge and skill sets of the user related to the topic. For example, the user profile may include a corporate directory that includes location and company role information about the user, a list of technical publications on the topic authored by the user, and Internet postings on the topic authored by the user.

At 708, the controller iteratively adds, to the query, the topically-relevant user attributes indicated by the iterative mapping to produce iterative queries that incrementally increase in technical detail on the topic. The controller provides the iterative queries to the AI model.

At 710, responsive to providing the iterative queries, the controller receives, from the AI model, iterative responses (e.g., one iterative response per iterative query) that incrementally increase in technical detail on the topic and have response comprehension levels that increase on the topic. The controller evaluates the response comprehension levels of the iterative responses based on a combination of (i) reading comprehension levels of the iterative responses, and (ii) quantities of technical details included in the iterative responses, for example. In that example, the controller increases the response comprehension levels with increases in the reading comprehension levels, and with increases in the quantities of the technical details.

At 712, upon determining that the response comprehension levels are less than the user comprehension level and that the topically-relevant user attributes have not been exhausted by previous iterations, the controller continues iterating to expand the iterative queries.

At 714, upon determining that the response comprehension levels are not less than the user comprehension level, or that the topically-relevant user attributes have been exhausted, the controller stops iterating, and identifies as a final response a last iterative response that has a comprehension level that most nearly matches the user comprehension level.

In summary, in an embodiment, a method includes receiving a query on a technical topic from a user who is associated with user attributes indicative of a skill set and knowledge (and comprehension level) of the user, and providing the query to an AI model to solicit from the AI model an AI response (i.e., an AI answer) on the technical topic and that has a quantifiable response comprehension level on the technical topic. The method systematically and iteratively injects into the query additional user attributes that are related/matched to the technical topic (i.e., topically-related user attributes) to generate iteratively expanded queries of increasing complexity on the technical topic in order to solicit iterative AI responses of increasing complexity on the technical topic, and which are iteratively/increasingly more aligned with the skill set and knowledge (and the comprehension level) of the user on the technical topic. The method evaluates comprehension levels of the AI responses using comprehension scoring algorithms to eventually deliver a final AI response that is a nearest match to the technical topic and the skill set and knowledge (and the comprehension level) of the user, as indicated by the user attributes.

Figure 8:
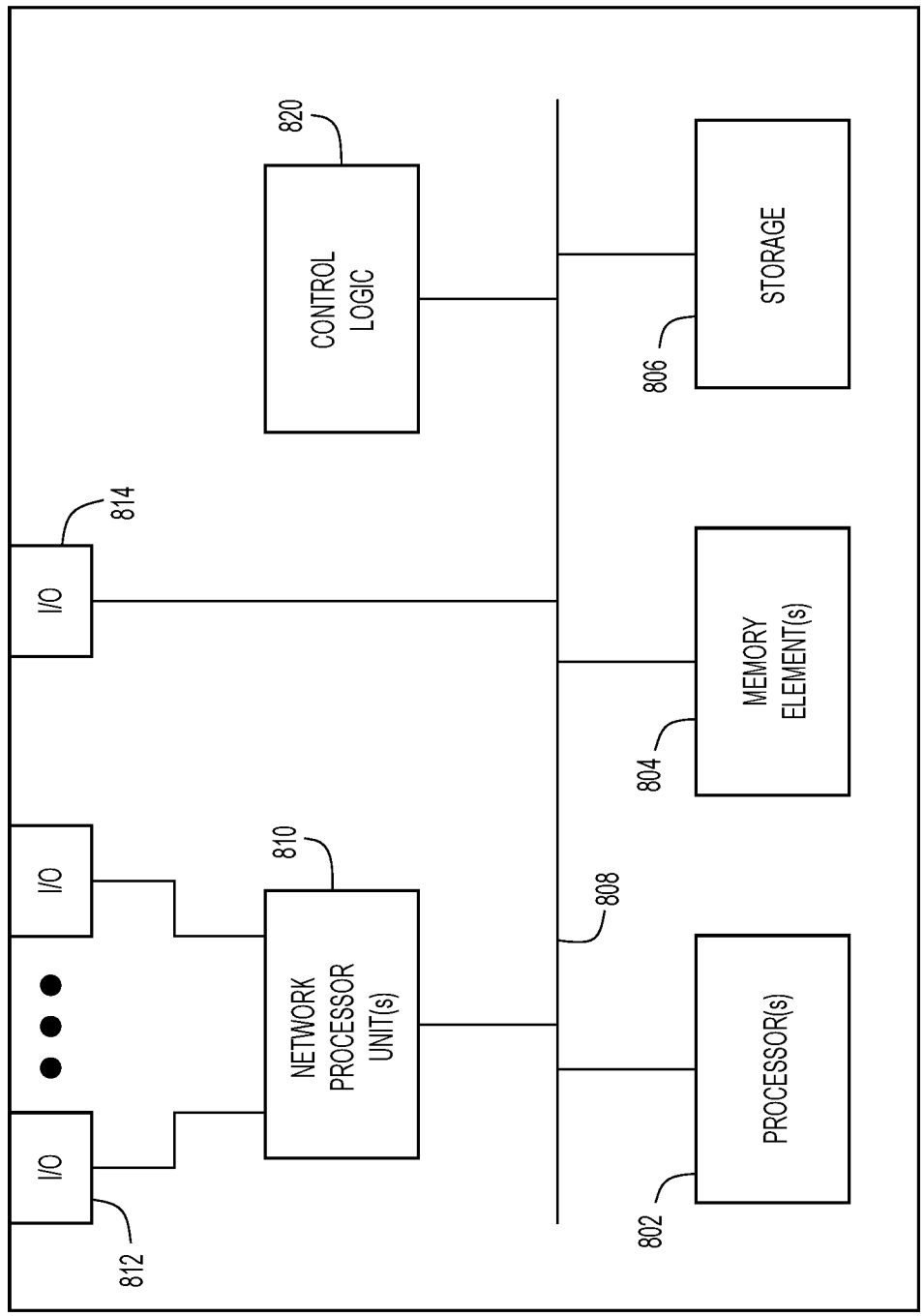
FIG. 8 illustrates a hardware block diagram of a computing device that may perform functions associated with operations discussed herein, according to an example embodiment.

Referring to FIG. 8, FIG. 8 illustrates a hardware block diagram of a computing device 800 that may perform functions associated with operations discussed herein in connection with the techniques depicted in FIGS. 1-7. In various embodiments, a computing device or apparatus, such as computing device 800 or any combination of computing devices 800, may be configured as any entity/entities as discussed for the techniques depicted in connection with FIGS. 1-7 in order to perform operations of the various techniques discussed herein. For example, computing device 800 may represent computer workstation 102.

In at least one embodiment, the computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, f processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in some aspects, the techniques described herein relate to a method including: receiving a query on a topic from a user associated with user attributes indicative of a user comprehension level on the topic; providing the query to an artificial intelligence (AI) model; receiving from the AI model a response to the query that has a response comprehension level on the topic that is less than the user comprehension level; iteratively adding, to the query, topically-relevant user attributes of the user attributes to produce iterative queries that increase in technical detail on the topic; providing the iterative queries to the AI model; responsive to providing the iterative queries, receiving, from the AI model, iterative responses that increase in the technical detail on the topic and have response comprehension levels that increase on the topic; and determining, among the iterative responses, a final response having a response comprehension level that most nearly matches the user comprehension level.

In some aspects, the techniques described herein relate to a method, the method further includes: for each iteratively adding, mapping the user attributes to the topic to identify the topically-relevant user attributes as particular user attributes among the user attributes that match or most closely align to the topic expressed in the query.

In some aspects, the techniques described herein relate to a method, wherein: mapping includes searching the user attributes in a user profile of the user that includes information that conveys technical knowledge and skill sets of the user related to the topic.

In some aspects, the techniques described herein relate to a method, wherein: the user profile includes a corporate directory that includes location and company role information about the user, a list of technical publications on the topic authored by the user, and Internet postings on the topic authored by the user.

In some aspects, the techniques described herein relate to a method, the method further includes: upon determining that the response comprehension levels are less than the user comprehension level, continuing iteratively adding and receiving the iterative responses to expand the iterative responses.

In some aspects, the techniques described herein relate to a method, further including: evaluating the response comprehension levels of the iterative responses based on a combination of reading comprehension levels of the iterative responses and quantities of technical details included in the iterative responses.

In some aspects, the techniques described herein relate to a method, wherein: evaluating the response comprehension levels further includes increasing the response comprehension levels with increasing reading comprehension levels, and increasing the response comprehension levels with increasing quantities of the technical details.

In some aspects, the techniques described herein relate to a method, the method further includes: upon determining that iteratively adding the topically-relevant user attributes has exhausted the topically-relevant user attributes among the user attributes, stopping iteratively adding and receiving the iterative responses, wherein determining the final response includes determining as the final response a last iterative response.

In some aspects, the techniques described herein relate to an apparatus including: one or more network processor units to communicate over one or more networks; and a processor coupled to the one or more network processor units and configured to perform: receiving a query on a topic from a user associated with user attributes indicative of a user comprehension level on the topic; providing the query to an artificial intelligence (AI) model; receiving from the AI model a response to the query that has a response comprehension level on the topic that is less than the user comprehension level; iteratively adding, to the query, topically-relevant user attributes of the user attributes to produce iterative queries that increase in technical detail on the topic; providing the iterative queries to the AI model; responsive to providing the iterative queries, receiving, from the AI model, iterative responses that increase in the technical detail on the topic and have response comprehension levels that increase on the topic; and determining, among the iterative responses, a final response having a response comprehension level that most nearly matches the user comprehension level.

In some aspects, the techniques described herein relate to an apparatus, wherein the processor is further configured to perform: for each iteratively adding, mapping the user attributes to the topic to identify the topically-relevant user attributes as particular user attributes among the user attributes that match or most closely align to the topic expressed in the query.

In some aspects, the techniques described herein relate to an apparatus, wherein: the processor is configured to perform mapping by searching the user attributes in a user profile of the user that includes information that conveys technical knowledge and skill sets of the user related to the topic.

In some aspects, the techniques described herein relate to an apparatus, wherein: the user profile includes a corporate directory that includes location and company role information about the user, a list of technical publications on the topic authored by the user, and Internet postings on the topic authored by the user.

In some aspects, the techniques described herein relate to an apparatus, the processor is further configured to perform: upon determining that the response comprehension levels are less than the user comprehension level, continuing iteratively adding and receiving the iterative responses to expand the iterative responses.

In some aspects, the techniques described herein relate to an apparatus, wherein the processor is further configured to perform: evaluating the response comprehension levels of the iterative responses based on a combination of reading comprehension levels of the iterative responses and quantities of technical details included in the iterative responses.

In some aspects, the techniques described herein relate to an apparatus, wherein: the processor is configured to perform evaluating the response comprehension levels by increasing the response comprehension levels with increasing reading comprehension levels, and increasing the response comprehension levels with increasing quantities of the technical details.

In some aspects, the techniques described herein relate to an apparatus, the processor is further configured to perform: upon determining that iteratively adding the topically-relevant user attributes has exhausted the topically-relevant user attributes among the user attributes, stopping iteratively adding and receiving the iterative responses, wherein the processor is configured to perform determining the final response by determining as the final response a last iterative response.

In some aspects, the techniques described herein relate to a non-transitory computer readable medium encoded with instructions that, when executed by a processor, cause the processor to perform: receiving a query on a topic from a user associated with user attributes indicative of a user comprehension level on the topic; providing the query to an artificial intelligence (AI) model; receiving from the AI model a response to the query that has a response comprehension level on the topic that is less than the user comprehension level; iteratively adding, to the query, topically-relevant user attributes of the user attributes to produce iterative queries that increase in technical detail on the topic; providing the iterative queries to the AI model; responsive to providing the iterative queries, receiving, from the AI model, iterative responses that increase in the technical detail on the topic and have response comprehension levels that increase on the topic; and determining, among the iterative responses, a final response having a response comprehension level that most nearly matches the user comprehension level.

In some aspects, the techniques described herein relate to a non-transitory computer readable medium, further including instructions to cause the processor to perform: for each iteratively adding, mapping the user attributes to the topic to identify the topically-relevant user attributes as particular user attributes among the user attributes that match or most closely align to the topic expressed in the query.

In some aspects, the techniques described herein relate to a non-transitory computer readable medium, wherein: the instructions to cause the processor to perform mapping include instructions to cause the processor to perform searching the user attributes in a user profile of the user that includes information that conveys technical knowledge and skill sets of the user related to the topic.

In some aspects, the techniques described herein relate to a non-transitory computer readable medium, wherein: the user profile includes a corporate directory that includes location and company role information about the user, a list of technical publications on the topic authored by the user, and Internet postings on the topic authored by the user.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing automated query context injection by an application hosted on a computer workstation that is configured to communicate with an artificial intelligence (AI) model over a network, the computer-implemented method comprising:
    upon receiving a query on a topic related to network technology from a user associated with user attributes stored in a computer database and indicative of a user comprehension level on the topic, providing the query to the AI model over the network;
    receiving from the AI model over the network a response to the query;
    by a machine learning (ML)/AI-based module:
        determining a response comprehension level on the topic based on a reading comprehension level of, and technical details in, the response; and
        upon determining that the response comprehension level is less than the user comprehension level, performing attribute-to-topic mapping that includes searching the user attributes, topic modeling, and attribute alignment that collectively map best-fitting topically-relevant user attributes, related to the network technology, to the query;
    adding, to the query, the best-fitting topically-relevant user attributes of the user attributes accessed from the computer database to produce an iterative query that expands on the query and includes an increase in the technical details on the topic related to the network technology relative to the query; and
    repeating providing, receiving, determining, performing the attribute-to-topic mapping, and adding, starting with the iterative query, to produce (i) subsequent iterative queries that iteratively increase in the technical details on the topic and expand on previous iterative queries, and (ii) iterative responses to respective ones of the subsequent iterative queries and that iteratively increase in the technical details and response comprehension levels on the topic related to the network technology, until a final response has a final response comprehension level that most nearly matches the user comprehension level.

2. The computer-implemented method of claim 1, wherein:
    the best-fitting topically-relevant user attributes include an Internet protocol and a network certification.

3. The computer-implemented method of claim 1, wherein:
    the query, on the topic related to the network technology, asks why the user has an Internet access problem, and the final response provides specific details on an Internet service provider and an operation of an Internet protocol that explain why the user has the Internet access problem.

4. The computer-implemented method of claim 3, wherein:
    the user attributes are stored in a user profile that includes a corporate directory that includes location and company role information about the user, a list of technical publications on the topic authored by the user, and Internet postings on the topic authored by the user.

5. The computer-implemented method of claim 1, further comprising:
   upon determining that the response comprehension levels are less than the user comprehension level, continuing iteratively adding and receiving the iterative responses to expand the iterative responses.

6. The computer-implemented method of claim 5, further comprising:
   evaluating the response comprehension levels of the iterative responses based on a combination of reading comprehension levels of the iterative responses and quantities of the technical details included in the iterative responses.

7. The computer-implemented method of claim 6, wherein:
   evaluating the response comprehension levels further includes increasing the response comprehension levels with increasing reading comprehension levels, and increasing the response comprehension levels with increasing quantities of the technical details.

8. The computer-implemented method of claim 1, further comprising:
   upon determining that iteratively adding the best-fitting topically-relevant user attributes has exhausted the best-fitting topically-relevant user attributes among the user attributes, stopping iteratively adding and receiving the iterative responses,
   wherein determining the final response includes determining as the final response a last iterative response.

9. An apparatus comprising:
   one or more network processor units to enable an application hosted on the apparatus to communicate with an artificial intelligence (AI) model over a network; and
   a processor coupled to the one or more network processor units and configured to perform automated query context injection by:
      upon receiving a query on a topic related to network technology from a user associated with user attributes stored in a computer database and indicative of a user comprehension level on the topic, providing the query to the AI model over the network;
      receiving from the AI model over the network a response to the query;
      by a machine learning (ML)/AI-based module:
         determining a response comprehension level on the topic based on a reading comprehension level of, and technical details in, the response; and
         upon determining that the response comprehension level is less than the user comprehension level, performing attribute-to-topic mapping that includes searching the user attributes, topic modeling, and attribute alignment that collectively map best-fitting topically-relevant user attributes, related to the network technology, to the query;
      adding, to the query, the best-fitting topically-relevant user attributes of the user attributes accessed from the computer database to produce an iterative query that expands on the query and includes an increase in the technical details on the topic related to the network technology relative to the query; and
      repeating providing, receiving, determining, performing the attribute-to-topic mapping, and adding, starting with the iterative query, to produce (i) subsequent iterative queries that iteratively increase in the technical details on the topic and expand on previous iterative queries, and (ii) iterative responses to respective ones of the subsequent iterative queries and that iteratively increase in the technical details and response comprehension levels on the topic related to the network technology, until a final response has a final response comprehension level that most nearly matches the user comprehension level.

10. The apparatus of claim 9, wherein:
    the best-fitting topically-relevant user attributes include an Internet protocol and a network certification.

11. The apparatus of claim 9, wherein:
    the query, on the topic related to the network technology, asks why the user has an Internet access problem, and the final response provides specific details on an Internet service provider and an operation of an Internet protocol that explain why the user has the Internet access problem.

12. The apparatus of claim 9, wherein:
    the user attributes are stored in a user profile that includes a corporate directory that includes location and company role information about the user, a list of technical publications on the topic authored by the user, and Internet postings on the topic authored by the user.

13. The apparatus of claim 9, the processor is further configured to perform:
    upon determining that the response comprehension levels are less than the user comprehension level, continuing iteratively adding and receiving the iterative responses to expand the iterative responses.

14. The apparatus of claim 13, wherein the processor is further configured to perform:
    evaluating the response comprehension levels of the iterative responses based on a combination of reading comprehension levels of the iterative responses and quantities of the technical details included in the iterative responses.

15. The apparatus of claim 14, wherein:
    the processor is configured to perform evaluating the response comprehension levels by increasing the response comprehension levels with increasing reading comprehension levels, and increasing the response comprehension levels with increasing quantities of the technical details.

16. The apparatus of claim 9, the processor is further configured to perform:
    upon determining that iteratively adding the best-fitting topically-relevant user attributes has exhausted the best-fitting topically-relevant user attributes among the user attributes, stopping iteratively adding and receiving the iterative responses,
    wherein the processor is configured to perform determining the final response by determining as the final response a last iterative response.

17. A non-transitory computer readable medium encoded with instructions that, when executed by a processor configured to communicate with an artificial intelligence (AI) model over a network, cause the processor to perform automated query context injection by:
    upon receiving a query on a topic related to network technology from a user associated with user attributes stored in a computer database and indicative of a user comprehension level on the topic, providing the query to the AI model over the network;
    receiving from the AI model over the network a response to the query;

by a machine learning (ML)/AI-based module:
  determining a response comprehension level on the topic based on a reading comprehension level of, and technical details in, the response; and
  upon determining that the response comprehension level is less than the user comprehension level, performing attribute-to-topic mapping that includes searching the user attributes, topic modeling, and attribute alignment that collectively map best-fitting topically-relevant user attributes, related to the network technology, to the query;
adding, to the query, the best-fitting topically-relevant user attributes of the user attributes accessed from the computer database to produce an iterative query that expands on the query and includes an increase in the technical details on the topic related to the network technology relative to the query; and
repeating providing, receiving, determining, performing the attribute-to-topic mapping, and adding, starting with the iterative query, to produce (i) subsequent iterative queries that iteratively increase in the technical details on the topic and expand on previous iterative queries, and (ii) iterative responses to respective ones of the subsequent iterative queries and that iteratively increase in the technical details and response comprehension levels on the topic related to the network technology, until a final response has a final response comprehension level that most nearly matches the user comprehension level.

18. The non-transitory computer readable medium of claim 17, wherein:
the best-fitting topically-relevant user attributes include an Internet protocol and a network certification.

19. The non-transitory computer readable medium of claim 17, wherein:
the query, on the topic related to the network technology, asks generally why the user has an Internet access problem, and the final response provides specific details on an Internet service provider and an operation of an Internet protocol that explain why the user has the Internet access problem.

20. The non-transitory computer readable medium of claim 17, wherein:
the user attributes are stored in a user profile that includes a corporate directory that includes location and company role information about the user, a list of technical publications on the topic authored by the user, and Internet postings on the topic authored by the user.

* * * * *